United States Patent Office 3,172,330
Patented Mar. 9, 1965

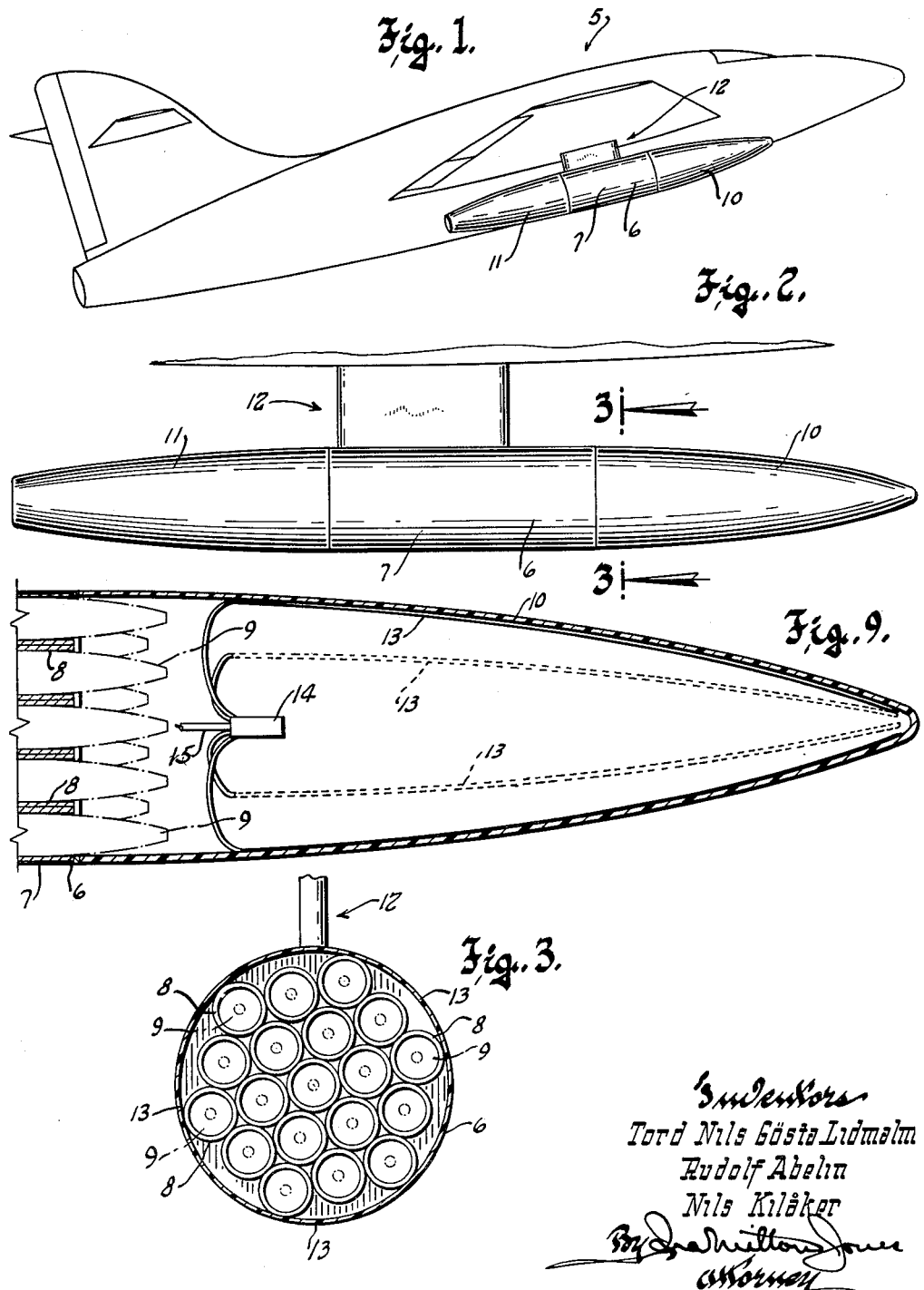

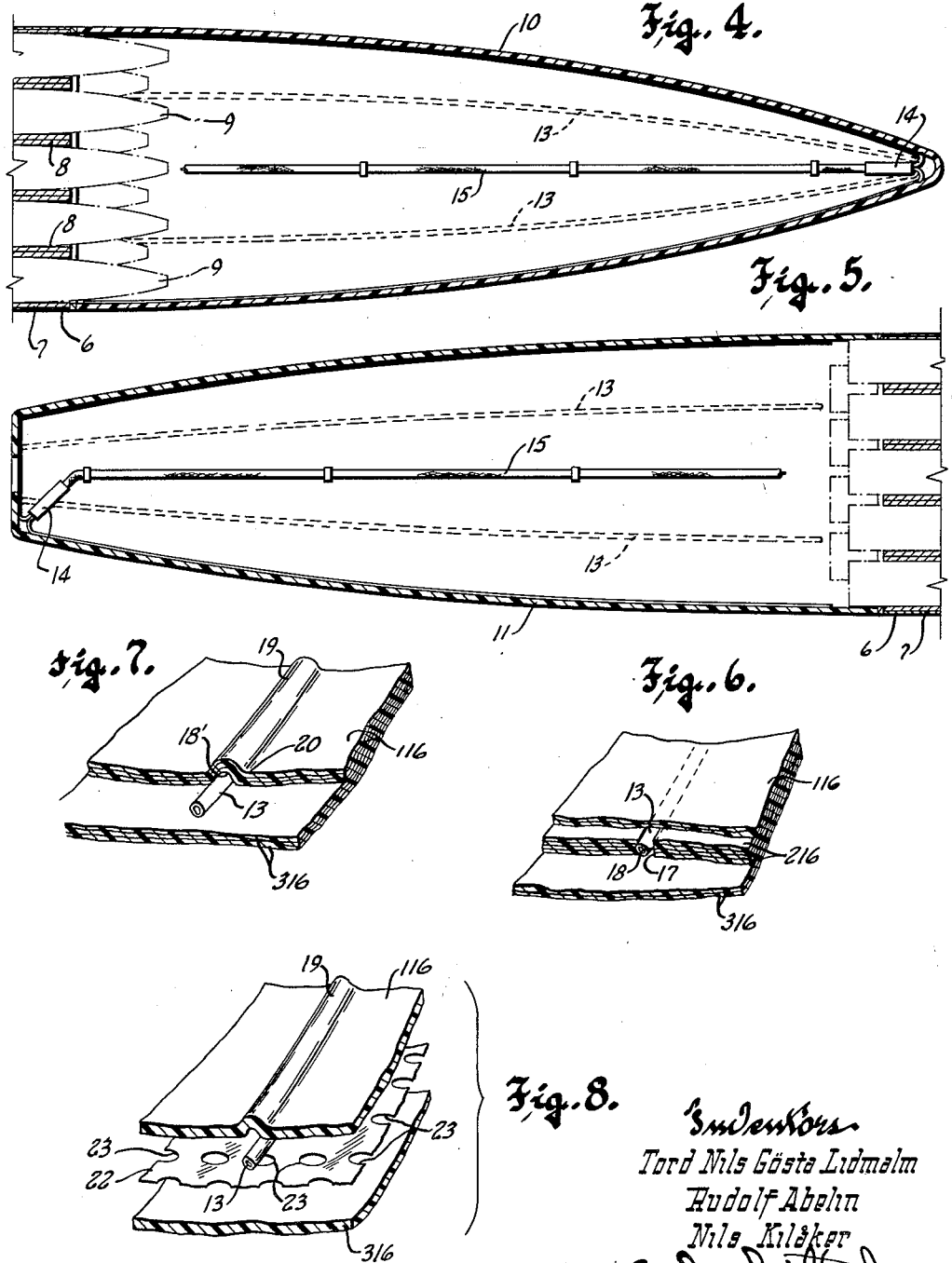

3,172,330
JETTISONABLE END CONE FOR AIRCRAFT
ROCKET MISSILE PODS
Tord Nils Gösta Lidmalm, Goteborg, and Rudolf Abelin and Nils Kilaker, Malmo, Sweden, assignors to Svenska Aeroplan Aktiebolaget, Linkoping, Sweden, a corporation of Sweden
Filed July 6, 1962, Ser. No. 208,691
9 Claims. (Cl. 89—1.7)

This invention relates to rocket pods adapted to be carried at the exterior of an aircraft and in which rocket missiles may be housed prior to their launching, and the invention refers more particularly to a readily jettisonable end cone for such rocket pods, and to a method of jettisoning such an end cone. This application is a continuation-in-part of our application Serial No. 852,411, filed November 12, 1959, now abandoned.

Rocket missiles adapted to be carried by and launched from an aircraft, such as air-to-air missiles, are usually housed in a pod or carrier fixed beneath the wing or fuselage of the aircraft. The portion of the pod in which the missiles are carried, and from which they are launched, resembles a honeycomb with a rocket missile in each cell, and the pod also comprises a nose cone in front of the rocket compartment and a tail cone behind it, by which the rocket compartment is streamlined prior to discharge of the missiles.

Desirably, the nose and tail cones should remain in place until the last possible instant before the rockets are launched, so that the rocket pod will exert a minimum of drag upon the aircraft that carries it. In some cases the prior practice has been to use a relatively weak nose cone, or a nose cone having localized weak areas in line with the course of the missiles, and to rely upon the propulsive force of the missiles to literally punch them through the nose cone. This expedient, which is disclosed in the patent to C. Re et al., No. 2,844,073, was unsatisfactory with rocket pods carried by very high speed aircraft, since a nose cone subjected to high speeds must be relatively strong in order to withstand the large air pressures imposed upon it, and therefore there was a possibility that with this arrangement the fuse on a rocket missile might be damaged as it penetrated the nose cone.

Another known expedient is the use of a nose cone which is intended to be detached from the rocket carrying portion of the pod immediately prior to launching of the missiles. In some instances such nose cones consisted of two parts, divided from one another longitudinally and held together by a frangible connection which is disrupted when the nose cone was to be jettisoned to permit air pressures to separate the two parts from one another and from the remainder of the pod. A structure of this type is disclosed in the Patent to L. O. Bergstrom, No. 2,609,730. Desirably, jettisoning of the nose cone of a rocket missile carrier pod should not have to be initiated until ten to fifteen milliseconds before the first rocket is launched from the carrier, and of course the nose cone should be completely clear of the path of the first rocket when it is launched. Nose cones of the type disclosed in the Bergstrom patent had the serious disadvantage that they comprised large units having substantial inertia, and they therefore moved slowly and required a relatively long time to be displaced off of the rocket compartment of the pod. Moreover, it was difficult to predetermine the course which such nose cone parts would take after leaving the pod, and, especially because of their large size and weight, they were dangerous to the aircraft that carried them, to following aircraft, and to objects on the ground.

With the foregoing in mind, it is an object of the present invention to provide an end cone for rocket missile pods which is adapted to be very quickly jettisoned immediately prior to launching of missiles carried in the pod, such jettisoning being effected by an abrupt shattering of the end cone into a large number of small, light fragments, each of which tends to move rapidly away from the vicinity of the missiles to be launched and none of which is large enough or heavy enough to cause damage to aircraft in flight or to persons or property on the ground.

Thus it is another and very important general object of this invention to provide a method of very rapidly jettisoning the nose cone of a carrier pod for rocket or similar missiles within a very short time interval before missiles are launched from the carrier and in a manner that avoids the possibility of damage to the missiles, a carrying aircraft, or persons or property on the ground.

Another object of this invention resides in the provision of a rocket pod end cone of the character described, the wall of which is made of frangible material and has charges of explosive material embedded therein at spaced apart locations, and wherein the explosive charges are adapted to be detonated simultaneously to effect jettisoning of the end cone by abruptly shattering it into small fragments.

To effect such abrupt shattering of the end core, a plurality of explosive charges embedded in the end cone wall at spaced apart locations are simultaneously detonated. It is of great importance, however, that the explosive force employed to fragment the end cone wall should not be of such magnitude as to cause damage to the central portion of the carrier in which the rocket missiles are housed, to the rocket missiles carried therein, or to a carrying aircraft. Hence it is another and very important object of this invention to provide a wall structure for a missile pod end cone which lends itself readily to jettisoning by the method and means above described without requiring the employment of explosive charges that might cause damage to structure other than the jettisonable end cone.

Another and more specific object of this invention resides in the provision of a rocket pod end cone comprising a substantially cup-shaped unit, the wall of which is formed of frangible material and has elongated strips of explosive material embedded therein, wherein the grooves which accommodate the explosive strips are defined by channel-like ridges in the wall which provide reinforcing ribs that strengthen the wall prior to its being shattered by detonation of the explosive strips, but which facilitate explosively fragmented jettisoning of the end cone when the explosive charge strips are detonated.

It is also a specific object of this invention to provide an end cone for aircraft rocket pods which is readily formed from laminated readily shatterable material so as to be simple and inexpensive to manufacture, and which because of its laminated construction tends to shatter into small fragments when jettisoned by detonation of explosive charges in contact with the wall at a number of spaced apart locations thereon, but wherein the wall nevertheless has high strength when whole, so as to be well able to withstand the large pressures and forces imposed upon it by high speed rapidly maneuvering flight.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a perspective view of an airplane having a rocket missile pod embodying the principles of this invention attached to the underside of its wing;

FIGURE 2 is a side elevational view of a rocket pod having nose and tail cones of this invention;

FIGURE 3 is a cross sectional view through the rocket pod taken on the plane of the line 3—3 in FIGURE 2;

FIGURE 4 is a longitudinal sectional view of the nose cone of the rocket pod shown in FIGURE 2;

FIGURE 5 is a longitudinal sectional view of the tail cone of the rocket pod shown in FIGURE 2;

FIGURE 6 is a fragmentary perspective view of a wall portion of a rocket pod end cone according to one version of this invention;

FIGURE 7 is a view similar to FIGURE 5 but illustrating a modified form of the end cone wall;

FIGURE 8 is a fragmentary disassembled perspective view of another modified form of a rocket pod end cone wall embodying the principles of this invention; and FIGURE 9 is a view similar to FIGURE 4 but illustrating a modified embodiment of the nose cone.

Referring now more particularly to the accompanying drawings, in which like reference numerals designate like parts throughout the several views, the numeral 5 designates generally an airplane having a rocket missile carrier or pod 6 embodying the principles of this invention attached beneath its wing. The pod comprises a central missile compartment 7 housing a plurality of lengthwise extending launching tubes 8 disposed in a honeycomb arrangement and in each of which a rocket missile 9 is carried and from which it is launched. The pod also includes a jettisonable nose cone 10 and a jettisonable tail cone 11, affixed to the front and rear, respectively, of the central rocket compartment 7 to streamline it and its load of missiles. It will be understood that the rocket compartment of the pod is secured to the airplane by connecting means of a known type, designated generally by 12, which holds the rocket compartment rigidly in place until the rockets have all been launched, and which provides for rapid jettisoning of the rocket compartment thereafter. It will also be understood that the rocket missile pod of this invention may be secured to an aircraft elsewhere than under its wing, as for example under the fuselage.

The nose cone 10 and tail cone 11, both of which are substantially cup-shaped, cooperate with the central rocket compartment of the pod to completely enclose the rockets prior to their launching, and consequently the end cones 10 and 11 must be gotten out of the way as quickly as possible, immediately before the missiles are launched, in order to prevent interference with launching of the rockets.

The present invention provides for very rapid and effective jettisoning of the end cones by explosively shattering them into very small, light fragments which are quickly blown away from the rocket compartment by the airstream around the pod and which cannot damage aircraft or objects on the ground. To effect such fragmentation of each end cone its wall is formed of a frangible material such as fibreglass reinforced plastic, and charges of explosive material 13 are secured in contact with the wall at a plurality of spaced apart locations thereon. Preferably the explosive charges comprise strips of readily detonated material embedded in the wall and extending lengthwise therethrough, and all of the explosive strips in each end cone are connected at one end to an electrical igniter 14 of known type so that all of the charges can be detonated simultaneously when the igniter is energized. Each igniter or detonator 14 is thus located near one end of the end cone and is energizable through an electrical conductor cable 15 that extends to the igniter and is connected with circuit making means (not shown) in the airplane. In the embodiment of the invention illustrated in FIGURES 4 and 5 the igniters 14 are respectively shown as located at the front end of the nose cone and the rear end of the tail cone, that is, in the portions of the end cones that are remote from the central missile compartment 7. In the modified nose cone illustrated in FIGURE 9 the igniter is shown as located nearer the central missile compartment 7, where it effects detonation of the explosive charges in such a manner as to achieve a more uniform bursting effect over the entire area of the nose cone skin.

To permit the end cone to be destructively jettisoned by fragmentation with the use of a small amount of explosives, thus avoiding any possibility of damage to missiles in the carrier or to the carrying aircraft, the wall of each end cone is formed of a plurality of laminations 116, 216, 316 of frangible material, which laminations are bonded together only at spaced apart portions of their adjacent surfaces, and the explosive strips 13 are confined between laminations so that the force of their explosion will effect the maximum possible shattering and fragmentation of all parts of the wall.

In the embodiment of the invention illustrated in FIGURE 6, the outermost and innermost laminations 116 and 316 are continuous and uninterrupted around the circumference of the end cone, while the medial laminations 216 are interrupted at circumferentially spaced intervals and the adjacent edges of the interrupted elements are spaced apart as at 17 to provide passages 18 in which the explosive strips are accommodated. The laminations have their adjacent surfaces bonded to one another in a known manner, so that the end cone comprises a unitary member which may be secured to the rocket compartment by any suitable means. It will be seen that upon detonation of the explosive strips the wall of the end cone constructed in the manner just described will readily fracture along the passages 18, as well as elsewhere across its area, and the laminations will tend to be separated from one another to further reduce the end cone to relatively small, light fragments.

The embodiment of the invention illustrated in FIGURE 7 provides an end cone having a wall with great capability for resisting damage or destruction due to the large air pressures incident to high speed rapidly maneuvering flight, but which can nevertheless shatter readily upon destructive jettisoning with a small amount of explosives, as contemplated by this invention. In this embodiment of the invention the wall of the end cone is formed of a plurality of uninterrupted laminations 116, 316 of readily frangible material, and the explosive strips are confined between laminations. Those laminations which are radially outward of the explosive strips are uninterrupted in cross sectional shape so as to provide the end cone with a smoothly streamlined contour, but those that lie inward of the strips are provided with substantially channel shaped ridges 19 defining grooves 18' in which the explosive strips are embedded. It will be seen that the ridges 19 serve as reinforcing ribs at the interior of the cone which strengthen the entire cup-shaped end cone structure, improving its ability to withstand external loads such as are imposed upon it by the airstream around the pod during flight; but the same ridges also constitute areas of weakness when the explosive strips are detonated, assuring shattering of the end cone into very small, light fragments. Further insuring that the fragments will be small and light, the construction just described facilitates separation of the laminations from one another when the explosive strips are detonated, because the channel shaped ridges 19 may curve, as at 20, out of the adjacent portions of the laminae in which they are formed, and these curves define corner pockets in the passages 18' in which the expanding gases can work to force the laminations apart.

In the embodiment of the invention shown in FIGURE 8 the separation of the laminations upon detonation of the explosive charges is further facilitated by reason of the fact that flatwise adjacent laminations 116 and 316 are bonded to one another only at small spaced apart areas of their opposing surfaces. To readily insure this result, a sheet 22 of waxed paper, viscose-cellulose or other material which is not readily bondable to the material of the end cone wall is interposed between the wall laminations. This sheet is apertured at spaced apart locations, as at 23, to enable the flatwise adjacent laminations on opposite sides of the sheet to be bonded to one another through the apertures. In other respects the embodiment of the invention shown in FIGURE 8 follows that of FIGURE 7, although it will be understood that the principles of the FIGURE 8 version of the invention may also be applied to an end cone made in accordance with FIGURE 6.

Obviously the principles of this invention are applicable to the rocket compartment itself, to permit it to be jettisoned by explosive fragmentation in the same way as the nose cone and tail cones.

From the foregoing description taken together with the accompanying drawings it will be apparent that this invention provides an end cone for an aircraft rocket missile pod or the like which may be jettisoned in flight with great rapidity by being explosively shattered into numerous small, light fragments that tend to be carried away quickly from the path of rocket missiles to be launched from the pod, and that offer no possibility of damage to rocket missiles in the carrier, an aircraft on which the carrier is mounted, or objects on the ground; and that the end cone of this invention is nevertheless well capable of withstanding the forces of wind and precipitation encountered in high speed rapidly maneuvering flight.

What is claimed as our invention is:

1. A carrier for rocket missiles and the like adapted to be mounted on the exterior of an aircraft and to remain in place on the aircraft while missiles are discharged therefrom, said carrier comprising:
   A. means defining an elongated central compartment having
      (1) a plurality of lengthwise extending launching tubes, each adapted to carry a missile, and
      (2) an outer skin which surrounds the launching tubes;
   B. means providing a streamlined tail cone for said central compartment;
   C. a nose cone for said central compartment which cooperates with its said outer skin and with the tail cone to streamline the carrier prior to launching of missiles therefrom and which is capable of withstanding the impacts of precipitation encountered during high speed flight, said nose cone comprising wall means of readily frangible material secured to the front of the central compartment; and
   D. means for rapidly separating the nose cone from the central compartment immediately prior to the launching of missiles, without damage to the remainder of the carrier, missiles carried therein, or an aircraft on which the carrier is mounted, and breaking the same into small fragments, said means comprising
      (1) a plurality of elongated charges of readily detonatable explosive material in the wall means at spaced apart locations and lying between the inner and outer faces thereof,
      (2) each of said charges having an end portion projecting from the wall means interiorly of the nose cone, and said end portions having their extremities contiguous to one another; and
      (3) means connected with said contiguous extremities of the explosive charges for simultaneously detonating said charges.

2. The carrier of claim 1 further characterized by the fact that (1) the wall means forming the nose cone is laminated and (2) that adjacent laminations are bonded to one another only at spaced apart portions of their adjacent surfaces so as to facilitate fragmentation of the nose cone wall.

3. The carrier of claim 1 further characterized by the fact that (1) the wall means forming the nose cone is composed of a plurality of laminations, and (2) the wall-forming laminations of the nose cone at one side of the charges has channel-like ridges defining grooves in which the explosive charges are confined and which provide rib-like reinforcements for the wall prior to its fragmentation.

4. The carrier of claim 1 further characterized by the fact that said end portions of the explosive charges project from the wall means near the front end of the nose cone; and further by the fact that said means for simultaneously detonating the charges is located in the nose cone near the front end thereof.

5. The carrier of claim 1 further characterized by the fact that said end portions of the explosive charges project from the wall means near the rear of the nose cone; and further by the fact that said means for simultaneously detonating the charges is located in the nose cone near the rear end thereof.

6. In a pod-like carrier having a compartment in which rocket missiles or the like are enclosed and carried in flight, an end cone adapted to be secured to one end of said compartment to cooperate with the skin of the latter in streamlining the carrier, and capable of being rapidly jettisoned immediately prior to discharge of missiles from said compartment, said end cone comprising:
   A. a cup shaped member comprising a wall of laminated readily frangible material,
      (1) the laminations of said wall being bonded together only at spaced apart portions of their adjacent surfaces so as to be readily separable from one another and
      (2) said wall having elongated passage means between laminations and extending through substantial but spaced apart portions of its length and circumference;
   B. readily detonatable explosive strip material in said passage means having an end portion that extends out of said wall into the hollow interior of the cup shaped member; and
   C. means for effecting jettisoning of the end cone comprising igniter means connected with said end portion of the explosive strip material to detonate the material and thus generate gases in said passage means at a pressure high enough to break the wall of the cup shaped member into fragments small and light enough to present no hazard to the carrier, missiles therein, or an aircraft carrying the same.

7. The end cone of claim 6, further characterized by a layer of material which is nonadhesive to the material comprising the laminations, interposed between the laminations to prevent them from adhering to one another but having discontinuities at spaced apart locations through which areas of opposing lamination surfaces can contact and be bonded to one another.

8. The end cone of claim 6, further characterized by the fact that said passage means is defined by substantially channel shaped ridges in an inner lamination which form ribs at the interior of the cup shaped member that reinforce and strengthen the wall of the same to enable it to resist loads imposed upon the cup shaped member in consequence of flight, but which constitute areas of weakness when the explosive strip material is detonated, to insure shattering of the wall of the cup shaped member into relatively small, light fragments.

9. The end cone of claim 6, further characterized by the fact that said passage means is defined by an intermediate lamination, confined between inner and outer laminations of the wall of the cup shaped member that are substantially continuous and uninterrupted, said intermediate lamination being interrupted at spaced intervals to provide adjacent but spaced apart edge portions.

References Cited in the file of this patent

UNITED STATES PATENTS

| | | |
|---|---|---|
| 2,609,730 | Bergstrom | Sept. 9, 1952 |
| 2,802,396 | Montgomery | Aug. 13, 1957 |
| 2,844,073 | Re et al. | July 22, 1958 |
| 2,937,595 | Margulis et al. | May 24, 1960 |
| 2,996,985 | Kratzer | Aug. 22, 1961 |